(12) United States Patent
Zheng

(10) Patent No.: US 12,341,217 B2
(45) Date of Patent: Jun. 24, 2025

(54) ENERGY STORAGE DEVICE AND ELECTRICAL DEVICE

(71) Applicant: Hithium Tech HK Limited, HongKong (CN)

(72) Inventor: Zhenhua Zheng, Fujian (CN)

(73) Assignee: Hithium Tech HK Limited, HongKong (CN)

( * ) Notice: Subject to any disclaimer, the term of this patent is extended or adjusted under 35 U.S.C. 154(b) by 0 days.

(21) Appl. No.: 18/806,711

(22) Filed: Aug. 16, 2024

(65) Prior Publication Data
US 2025/0105437 A1    Mar. 27, 2025

(30) Foreign Application Priority Data

Sep. 22, 2023   (CN) .......................... 202311226799.1

(51) Int. Cl.
  *H01M 10/658*   (2014.01)
  *H01M 50/209*   (2021.01)
  *H01M 50/342*   (2021.01)

(52) U.S. Cl.
  CPC ..... *H01M 50/3425* (2021.01); *H01M 10/658* (2015.04); *H01M 50/209* (2021.01); *H01M 2200/20* (2013.01)

(58) Field of Classification Search
  CPC .......... H01M 50/3425; H01M 10/658; H01M 50/209; H01M 2200/20
  See application file for complete search history.

(56) References Cited

U.S. PATENT DOCUMENTS

| 2021/0296625 A1 | 9/2021 | Li et al. |
| 2023/0021740 A1 | 1/2023 | Park et al. |
| 2023/0114279 A1 | 4/2023 | Yang et al. |

FOREIGN PATENT DOCUMENTS

| CN | 110148692 A | 8/2019 |
| CN | 213026307 U | 4/2021 |
| CN | 113013531 A | 6/2021 |
| CN | 215816102 U  *  | 2/2022 |

(Continued)

OTHER PUBLICATIONS

Machine translation of CN-215816102-U (Year: 2024).*

(Continued)

*Primary Examiner* — Lingwen R Zeng

(57) ABSTRACT

An energy storage device includes a box body, a battery module, and a heat insulation plate. The battery module includes multiple battery cells and a separator arranged on the multiple battery cells. The separator has multiple pressure relief holes arranged corresponding to explosion-proof valves of the multiple battery cells, respectively. The heat insulation plate is arranged between a top of the box body and the battery module. The heat insulation plate has multiple thinned regions. The separator includes multiple protrusions. The multiple protrusions are arranged between the multiple pressure relief holes and the multiple thinned regions, respectively. Each of the multiple protrusions is hollowed to form a communication end and a hollowed-out end. The communication end is in communication with a corresponding one of the multiple pressure relief holes. The hollowed-out end is configured to support a corresponding one of the multiple thinned regions and constructed to be hollowed.

18 Claims, 13 Drawing Sheets

(56) References Cited

FOREIGN PATENT DOCUMENTS

| | | | |
|---|---|---|---|
| CN | 218299959 U | 1/2023 | |
| CN | 218414939 U | 1/2023 | |
| CN | 115911735 A | 4/2023 | |
| CN | 116979211 A | 10/2023 | |
| EP | 3965213 A1 | 3/2022 | |
| WO | 2022142609 A1 | 7/2022 | |
| WO | 2023141774 A1 | 8/2023 | |
| WO | 2023151298 A1 | 8/2023 | |

OTHER PUBLICATIONS

International Search Report dated May 20, 2024 in International Application No. PCT/CN2024/074087. English translation attached.
Written Opinion of the International Search Authority dated May 20, 2024 in International Application No. PCT/CN2024/074087. English translation attached.
The Grant Notice from corresponding Chinese Application No. 202311226799.1 dated Nov. 5, 2023. English translation attached.
Extended European Search Report dated Mar. 12, 2025 received in corresponding European Application No. EP24196472.5.

\* cited by examiner

ENERGY STORAGE DEVICE AND ELECTRICAL DEVICE

CROSS-REFERENCE TO RELATED APPLICATION

The present application claims the benefit of priority of the Chinese Patent Application No. 202311226799.1 filed on Sep. 22, 2023, which is incorporated herein by reference in its entirety.

FIELD

The present disclosure relates to the field of energy storage technologies, and more particularly, to an energy storage device and an electrical device.

BACKGROUND

As an energy storage device, a battery pack usually includes a battery module and a battery management system. The battery module includes a plurality of battery cells arranged in parallel. When thermal runaway occurs in a battery cell in the battery module, a high-temperature and high-pressure gas ejected by the battery cell seriously affects other battery cells in the battery pack, affecting safety performance of the battery pack.

SUMMARY

Based on this, it is necessary to provide an energy storage device and an electrical device, to address a problem that a battery cell subjected to thermal runaway seriously affects other battery cells.

An energy storage device includes: a box body; a battery module arranged in the box body. The battery module includes a plurality of battery cells and a separator arranged on the plurality of battery cells, the separator has a plurality of pressure relief holes, the plurality of pressure relief holes being arranged corresponding to explosion-proof valves of the plurality of battery cells, respectively. The energy storage device further includes a heat insulation plate arranged between a top of the box body and the battery module. The heat insulation plate has a plurality of thinned regions. The separator includes a plurality of protrusions protruding towards the heat insulation plate. The plurality of protrusions are arranged between the plurality of pressure relief holes and the plurality of thinned regions, respectively. Each of the plurality of protrusions is hollowed to form a communication end and a hollowed-out end. The communication end is in communication with a corresponding one of the plurality of pressure relief holes. The hollowed-out end is configured to support a corresponding one of the plurality of thinned regions and constructed to be hollowed.

An electrical device is provided. The electrical device includes: a load; and the energy storage device according to any of the above embodiments. The load and the energy storage device are electrically connected to each other. The electrical device has the same technical effect as the energy storage device as described above, and thus details thereof will be omitted here.

Figure 1:
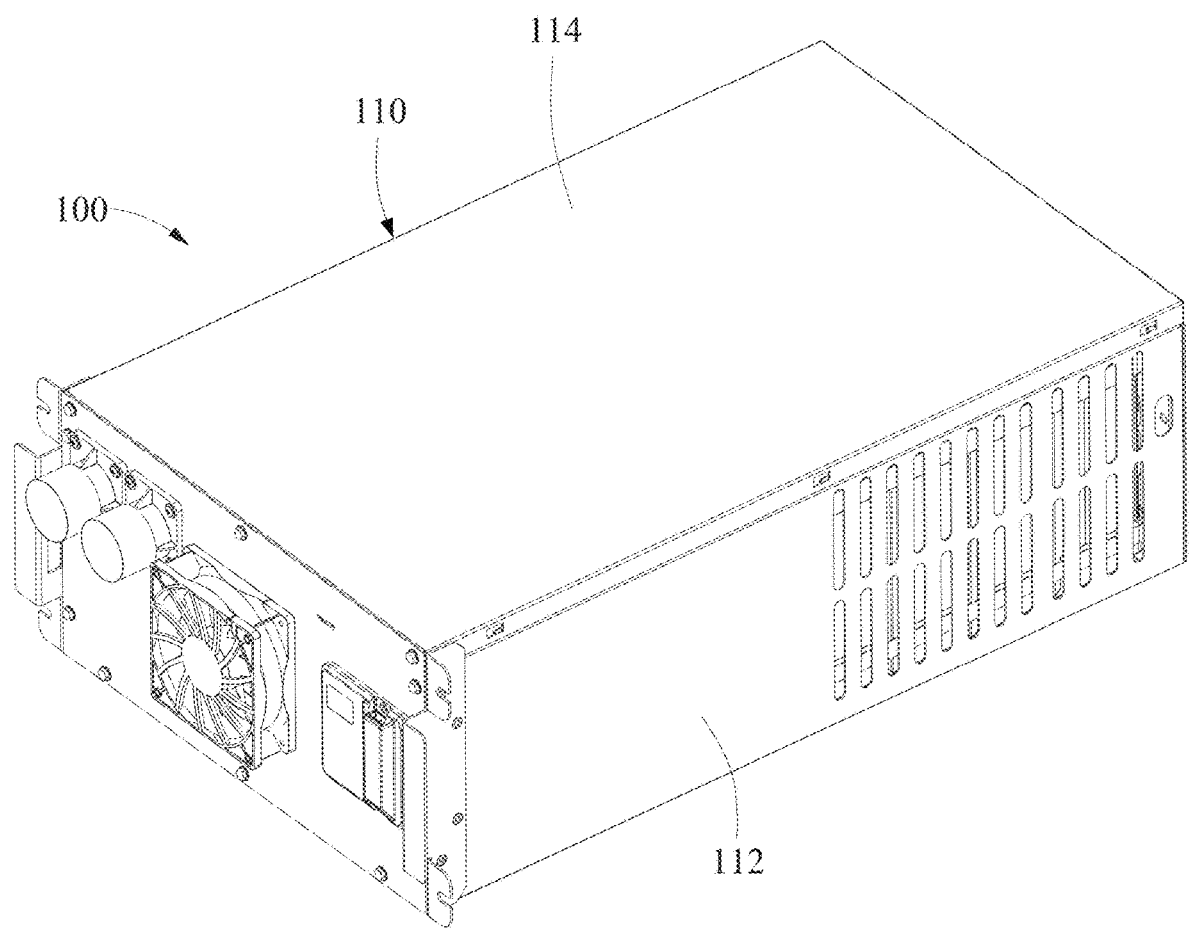
FIG. 1 is a schematic view of a structure of an energy storage device according to an embodiment of the present disclosure.

Reference numerals:

100-energy storage device;
110-box body; 112-main body; 114-top cover; 116-accommodation space;
120-battery module; 122-battery cell; 124-explosion-proof valve;
130/162-heat insulation plate; 132-thinned region; 134-recess; 136-second position-limiting portion;
140-separator; 141-pressure relief hole; 142-raised bar; 143-spacer bar; 144-wiring groove;
150-protrusion; 151-communication end; 152-hollowed-out end;
153-first portion;
154-second portion; 155-rib; 156-first position-limiting portion;
157-chamfer;
200-electrical device; 210-load.

DETAILED DESCRIPTION

In order to clarify the above-mentioned objects, features, and advantages of the present disclosure, specific embodiments of the present disclosure are described in detail below in conjunction with the accompanying drawings. In the following description, many specific details are provided to facilitate full understanding of the present disclosure. However, the present disclosure can be implemented in various manners other than those described herein, and similar improvements can be made by those skilled in the art without contradicting the intent of the present disclosure. Therefore, the present disclosure is not limited by specific embodiments disclosed below.

In the description of the present disclosure, it should be understood that the orientation or the position indicated by terms such as "center," "longitudinal," "lateral," "length," "width," "thickness," "over," "below," "front," "rear," "left," "right," "vertical," "horizontal," "top," "bottom," "inner," "outer," "clockwise," "anti-clockwise," "axial," "radial," and "circumferential" should be construed to refer to the orientation or the position as shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the terms "first" and "second" are only used for descriptive purposes and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, unless otherwise specifically defined.

In the present disclosure, unless otherwise clearly specified and limited, terms such as "install," "connect," "connect to," "fix," and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. For those of ordinary skill in the art, the specific meaning of the above-mentioned terms in the present disclosure can be understood according to specific circumstances.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

It should be noted that when an element is described as being "fixed to" or "arranged on" another element, it may be directly on the other element or an intermediate element may exit. When an element is interpreted as being "connected" to another element, it may be directly connected to the other element or an intermediate element may exit simultaneously. The terms "vertical," "horizontal," "over," "below," "left," and "right" and similar expressions in the presented disclosure, if any, are used for illustrative purposes only and are not meant to be the only means of implementation.

Figure 2:
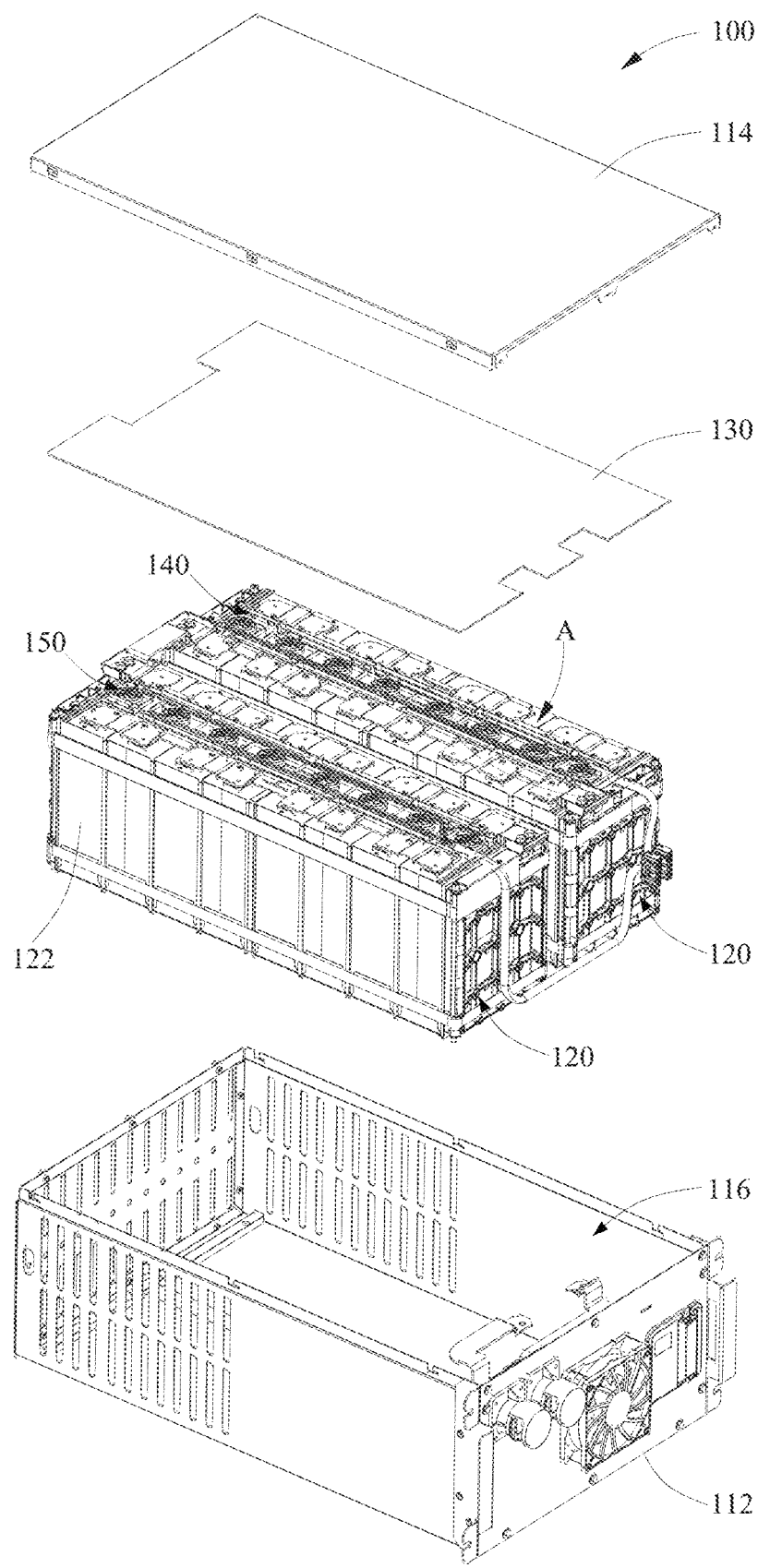
FIG. 2 is an exploded view of the energy storage device of FIG. 1 from a perspective.

FIG. 1 illustrates a schematic view of a structure of an energy storage device according to an embodiment of the present disclosure. FIG. 2 illustrates an exploded view of the energy storage device of FIG. 1 from a perspective. As illustrated in FIG. 1 and FIG. 2, an energy storage device 100 according to an embodiment of the present disclosure includes a box body 110, a battery module 120, and a heat insulation plate 130. The heat insulation plate 130 is arranged between a top of the box body 110 and the battery module 120, which can provide effective heat insulation to prevent the battery module 120 from overheating in a high temperature environment, protecting the battery module 120. Therefore, a service life of the energy storage device 100 is prolonged and safety of the energy storage device 100 is improved. It should be noted that, the energy storage device 100 may be, but is not limited to being, a battery pack, a battery system, an energy storage container, an energy storage cabinet, or other energy storage devices. The invention concept of the present disclosure is illustrated in the present disclosure by taking the energy storage device 100 as a battery pack as an example, which is exemplary and does not constitute a limitation.

In this embodiment, the box body 110 includes a main body 112 and a top cover 114. The top cover 114 is configured to cover the main body 112 to form an accommodation space 116. Two battery modules 120 are arranged in parallel in the accommodation space 116 of the box body 110. Each battery module 120 is arranged in a length direction of the box body 110. It should be understood that, in other embodiments, the box body 110 may include an outer shell and a bottom plate. The outer shell is arranged at the bottom plate to form the accommodation space. In addition, a quantity of battery modules 120 is not limited to two, which may be set as one or more than three as desired. A direction in which a plurality of battery modules 120 are arranged in parallel is not limited to a width direction of the box body 110.

Figure 3:
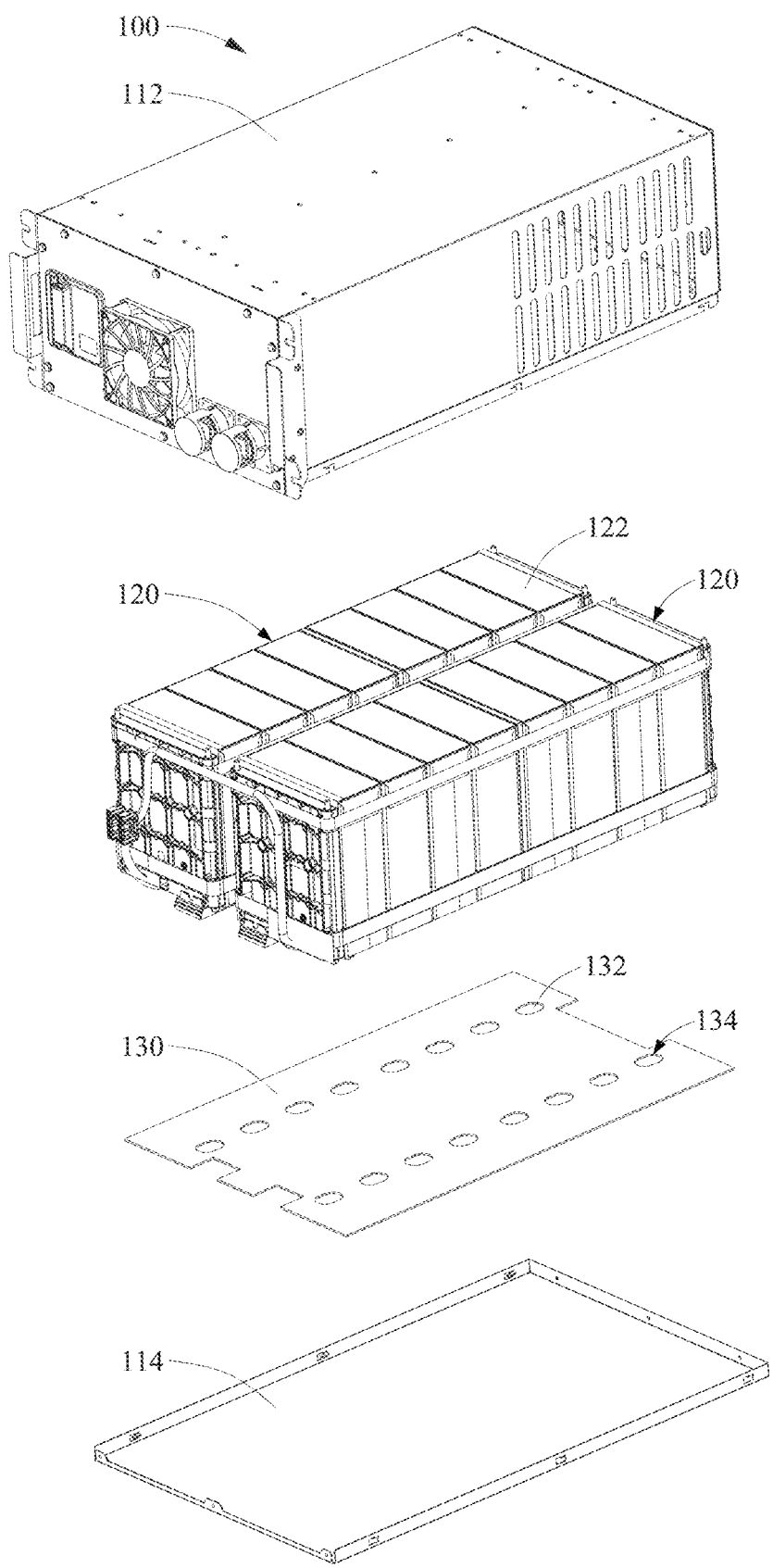
FIG. 3 is an exploded view of the energy storage device of FIG. 1 from another perspective.
Figure 4:
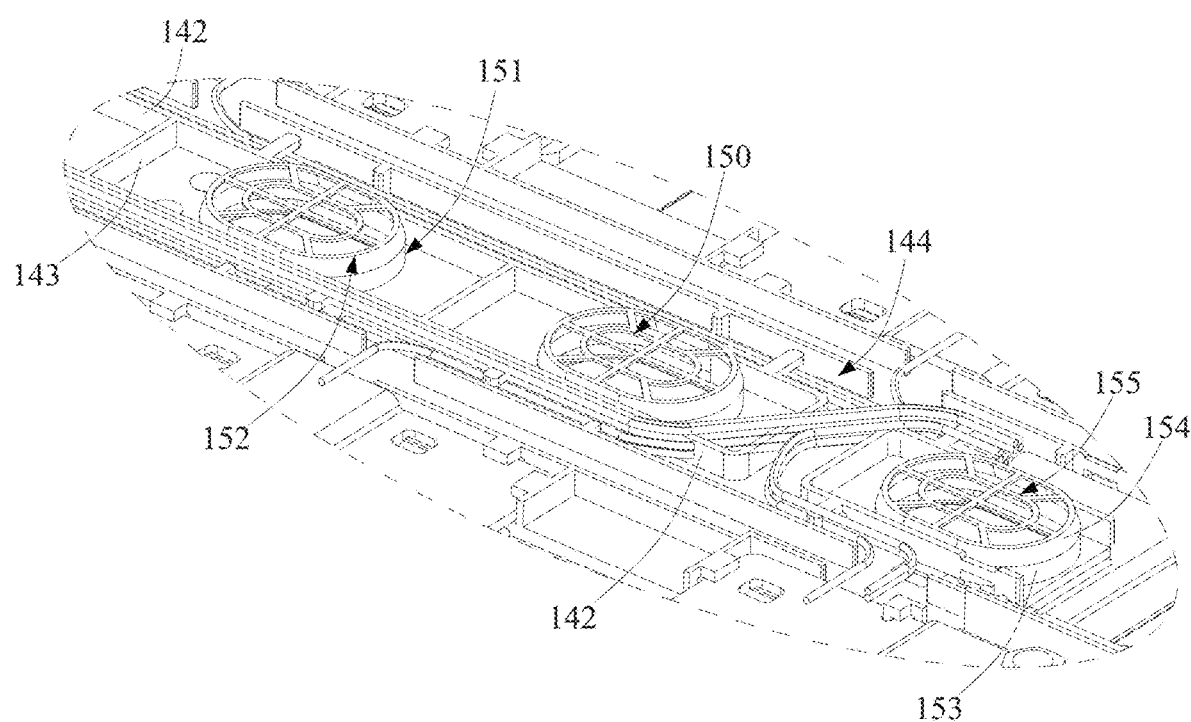
FIG. 4 is an enlarged partial view of region A of FIG. 2.
Figure 5:
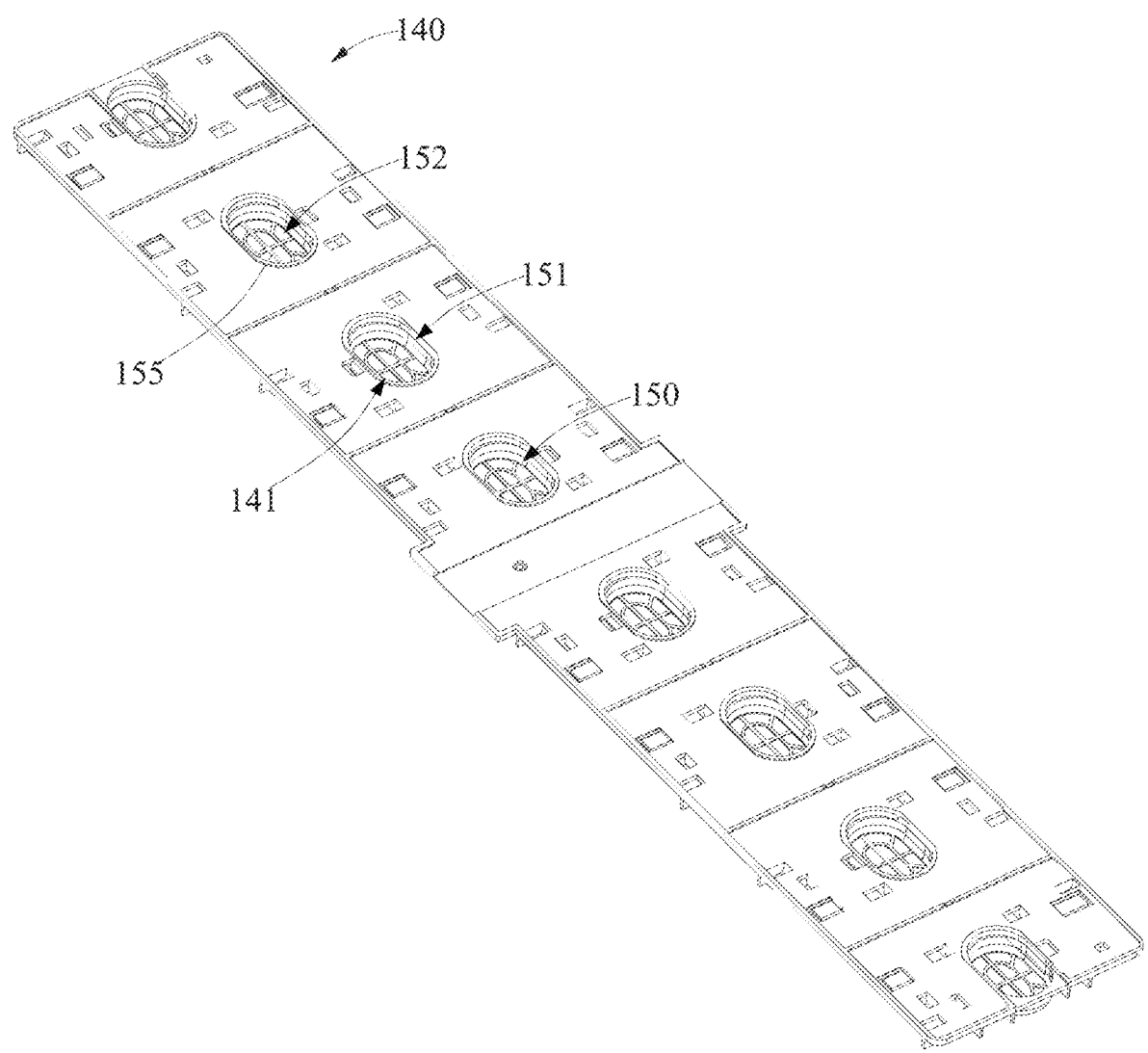
FIG. 5 is a schematic view of a structure of a separator of the energy storage device of FIG. 2.

FIG. 3 illustrates an exploded view of the energy storage device according to this embodiment from another perspective. FIG. 4 illustrates an enlarged partial view of region A of FIG. 2. FIG. 5 illustrates a schematic view of a structure of a separator of the energy storage device of FIG. 2. As illustrated in FIG. 3 to FIG. 5 and in conjunction with FIG. 2, the battery module 120 includes a plurality of battery cells 122 and the separator 140. The separator 140 is arranged at the plurality of battery cells 122 and has a plurality of pressure relief holes 141. The plurality of pressure relief holes 141 are arranged corresponding to explosion-proof valves of the plurality of battery cells 122, respectively. The heat insulation plate 130 has a plurality of thinned regions 132. The separator 140 includes a plurality of protrusions 150 protruding towards the heat insulation plate 130. The plurality of protrusions 150 are arranged between the plurality of pressure relief holes 141 and the plurality of thinned regions 132, respectively. Each of the plurality of protrusions 150 is hollowed to form a communication end 151 and a hollowed-out end 152. The communication end 151 is in communication with a corresponding one of the plurality of pressure relief holes 141. The hollowed-out end 152 is configured to support a corresponding one of the plurality of thinned regions 132 and constructed to be hollowed.

The heat insulation plate 130 has the plurality of thinned regions 132. Correspondingly, the separator 140 has the plurality of protrusions 150. The communication end 151 of each of the plurality of protrusions 150 that are hollowed is in communication with the corresponding one of the plurality of pressure relief holes 141 and is therefore arranged corresponding to a corresponding one of the explosion-proof valves. The hollowed-out end 152 of the protrusion 150 has a hollowed-out part arranged corresponding to the thinned region 132. Therefore, a pressure relief channel is formed between the thinned region 132 and the explosion-proof valve. When the explosion-proof valve is subjected to valve venting due to thermal runaway of a battery cell 122, a high-temperature and high-pressure gas or liquid can pass through the pressure relief channel and break through the thinned region 132 to enter between the heat insulation plate 130 and the top (top cover 114) of the box body 110, which prevents the high-temperature and high-pressure gas or liquid from splashing onto and damaging other battery cells 122, improving thermal safety of the energy storage device 100. Moreover, the thinned region 132 of the heat insulation plate 130 is supported by the hollowed-out end 152 of the protrusion 150, which can prevent the high-temperature and high-pressure gas or liquid from hitting the top cover 114 of the box body 110, preventing the high-temperature and high-pressure gas or liquid from flowing back and reversely breaking through thinned regions 132 at other positions, and keeping the high-temperature and high-pressure gas or liquid from rushing to other explosion-proof valves. Therefore, an adverse effect brought about by thermal runaway of a single battery cell 122 is greatly mitigated, which greatly improves the thermal safety of the energy storage device 100.

In this embodiment, the thinned region 132 is formed by defining a recess 134. The recess 134 is recessed in a direction away from the separator 140. The hollowed-out end 152 extends into the recess 134. During an assembly, the plurality of thinned regions 132 of the heat insulation plate 130 may correspond to the plurality of protrusions 150 in a one-to-one correspondence. Then, the heat insulation plate 130 is arranged at the protrusion 150 to enable at least part of the hollowed-out end 152 of the protrusion 150 to be arranged in the recess 134. In this way, the recess 134 can serve to pre-position the heat insulation plate 130 and facilitate an engagement between the hollowed-out end 152 and the thinned region 132. It should be noted that, in other embodiments, the recess 134 of the heat insulation plate 130 may be recessed in a direction away from the top cover 114 of the box body 110. The hollowed-out end 152 of the protrusion 150 is supported at a surface of the thinned region 132 away from the top cover 114 and cannot extend into the recess 134. In this way, the heat insulation plate 130 can be positioned and fixed by a structure at the box body 110.

In this embodiment, the protrusion 150 includes a first portion 153 and a second portion 154 in communication with the first portion 153. The communication end 151 is an end of the first portion 153 away from the second portion 154. The hollowed-out end 152 is an end of the second portion 154 away from the first portion 153. The hollowed-out end 152 tapers towards a center with respect to another end of the second portion 154. In this way, the part of the pressure relief channel formed at the second portion 154 gradually tapers in a pressure relief direction. That is, from a perspective of an orthographic projection, an orthographic projection region of the hollowed-out end 152 at the heat insulation plate 130 is surrounded and spaced apart by an orthographic projection region of another end of the second portion 154 at the heat insulation plate 130.

Since a part of the pressure relief channel formed by the second portion 154 gradually tapers in a direction towards the heat insulation plate 130, the high-temperature and high-pressure gas or liquid can be guided and gathered by the part of the pressure relief channel. Therefore, the high-temperature and high-pressure gas or liquid can break through the thinned region 132 more effectively to be fully discharged into a space between the heat insulation plate 130 and the top cover 114. It should be noted that, in other embodiments, the first portion 153 may have a same or similar structure as the second portion 154. That is, a part of the pressure relief channel formed by the first portion 153 also gradually tapers in the direction towards the heat insulation plate 130. Alternatively, the entire protrusion 150 may have a same or similar structure as the second portion 154. That is, the entire pressure relief channel gradually tapers in the direction towards the heat insulation plate 130.

Figure 6:
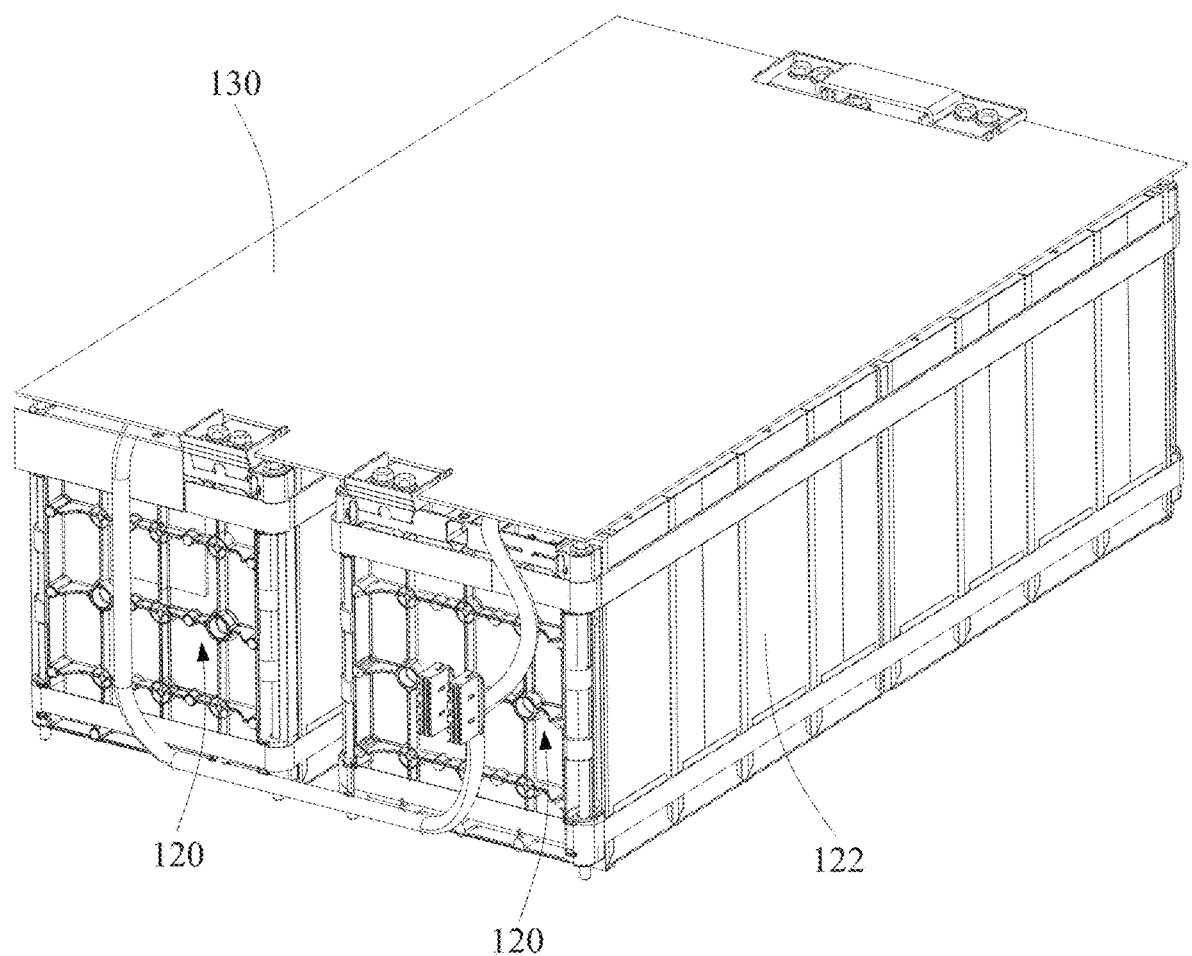
FIG. 6 is a schematic view of a structure of a battery module and a heat insulation plate of the energy storage device of FIG. 1.
Figure 7:
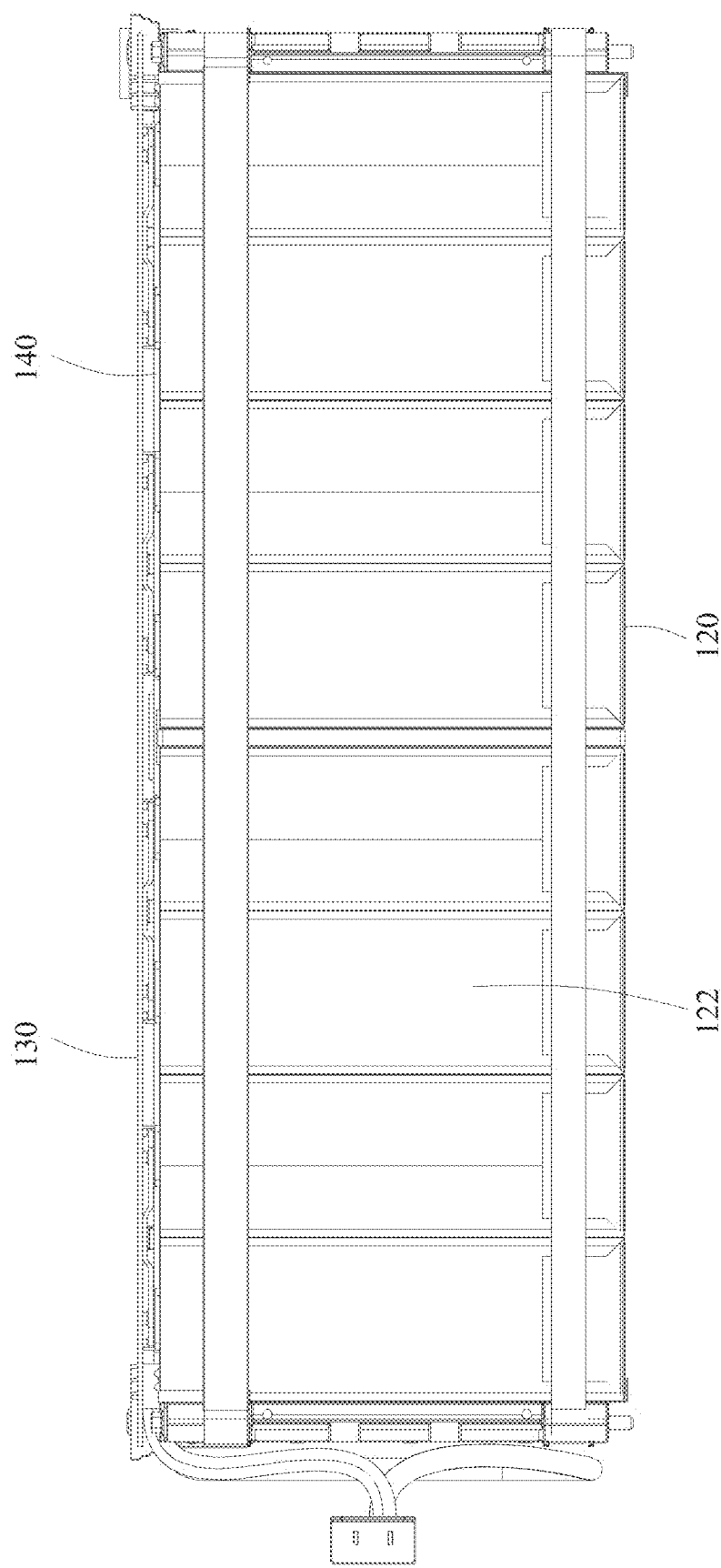
FIG. 7 is a side view of the structure illustrated in FIG. 6.
Figure 8:
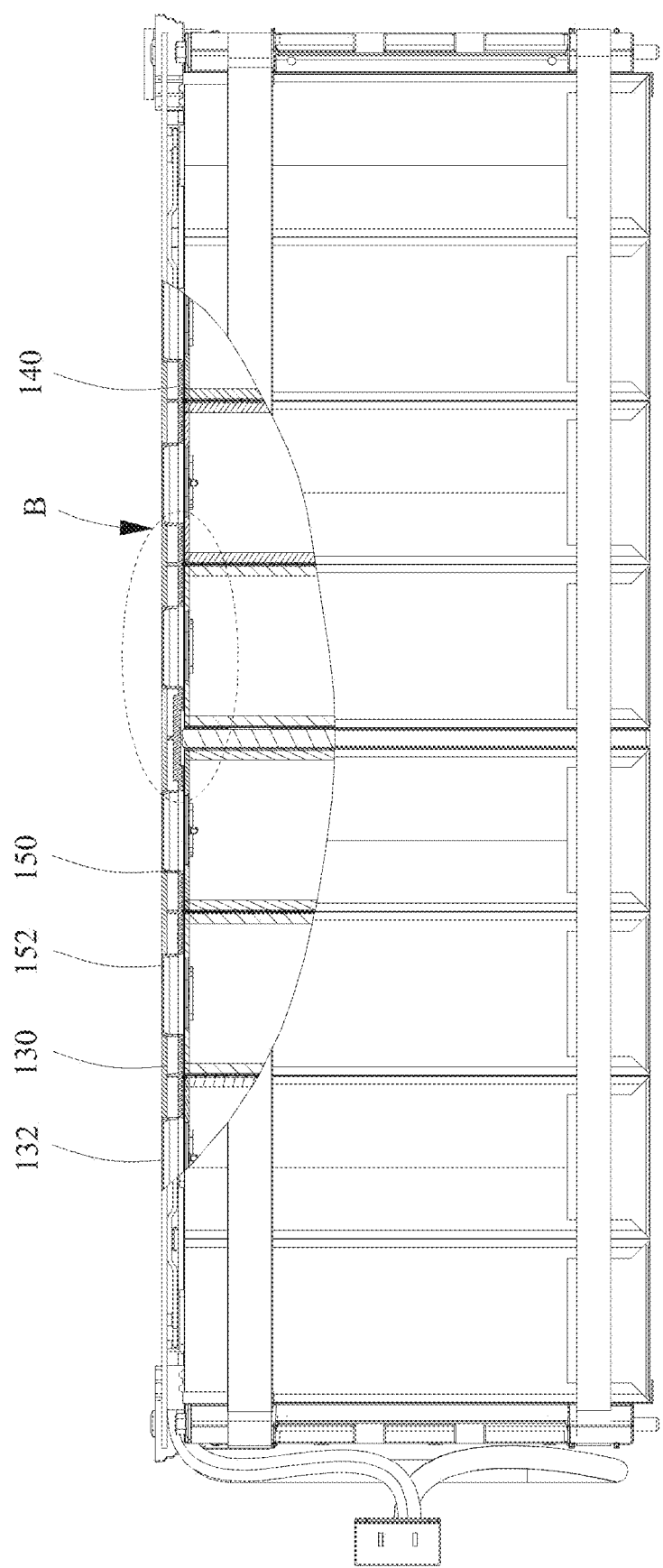
FIG. 8 is a sectional partial view of a structure illustrated in FIG. 7.
Figure 9:
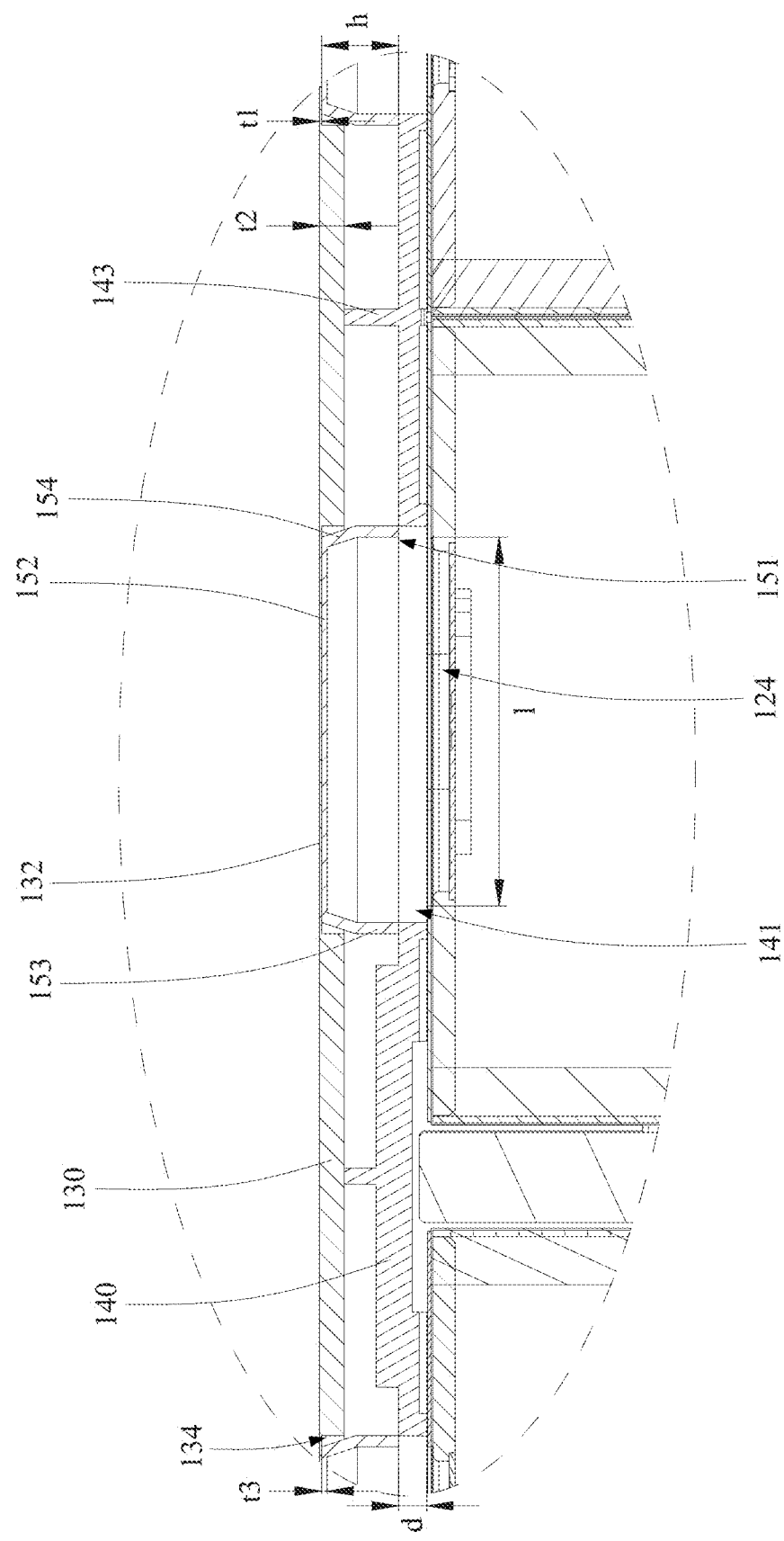
FIG. 9 is an enlarged partial view of region B of FIG. 8.

FIG. 6 illustrates a schematic view of a structure of a battery module and a heat insulation plate of the energy storage device according to this embodiment. FIG. 7 illustrates a side view of the structure illustrated in FIG. 6. FIG. 8 illustrates a sectional partial view of a structure illustrated in FIG. 7. FIG. 9 illustrates an enlarged partial view of region B of FIG. 8. As illustrated in FIG. 6 to FIG. 9, the thinned region 132 has a thickness t1 smaller than half of a thickness t2 of the heat insulation plate 130. Further, the thinned region 132 has the thickness t1 smaller than a quarter of the thickness t2 of the heat insulation plate 130. In this way, the thinned region 132 is more likely to be broken through by the high-temperature and high-pressure gas or liquid. In this embodiment, the thickness t1 of the thinned region 132 may range from, but is not limited to ranging from, 0.1 mm to 0.3 mm.

A sum of a height h of the protrusion 150 and a depth d of the pressure relief hole 141 is greater than half of a maximum length l of the explosion-proof valve 124. Therefore, a sufficient space is provided for a rupture of an explosion-proof film of the explosion-proof valve 124 to ensure normal opening of the explosion-proof valve 124, allowing the high-temperature and high-pressure gas or liquid to smoothly escape through the explosion-proof valve 124 and enter the pressure relief channel. In this embodiment, the sum of the height h of the protrusion 150 and the depth d of the pressure relief hole 141 is equal to 0.6 times the maximum length l of the explosion-proof valve 124. Obviously, in other embodiments, the sum of the height h of the protrusion 150 and the depth d of the pressure relief hole 141 may be 0.7 times, 0.8 times, or more times the maximum length l of the explosion-proof valve 124.

As illustrated in FIG. 4 and FIG. 5, the hollowed-out end 152 is constructed to be hollowed to be provided with a plurality of ribs 155 intersecting each other. Therefore, the plurality of ribs 155 can enlarge a support area to better support the thinned region 132, allowing various parts of the thinned region 132 to be uniformly supported. Each of the plurality of ribs 155 has a thickness t3 ranging from 0.3 mm to 0.6 mm. The rib 155 can quickly melt under an action of the high-temperature and high-pressure gas or liquid to facilitate discharge of the gas, and absorb part of the heat in the high-temperature and high-pressure gas or liquid, without affecting support provided by ribs 155 at hollowed-out ends 152 corresponding to other thinned regions 132. It should be noted that the thickness t3 of the rib 155 is a dimension in a thickness direction of the heat insulation plate 130.

In this embodiment, the rib 155 has the thickness t3 of 0.5 mm. In other embodiments, the rib 155 may have the thickness t3 of 0.3 mm, 0.4 mm, or 0.6 mm.

Further, the plurality of ribs 155 intersect in a shape of a grid. A specific shape of the grid is not limited to a shape illustrated in the figures, as long as the discharge of the high-temperature and high-pressure gas can be facilitated. That is, without affecting a support effect, the larger the spacing between the grids, the better.

It should be noted that the protrusion 150 is arranged around the pressure relief hole 141, while the pressure relief hole 141 is arranged corresponding to the explosion-proof valve 124. That is, the protrusion 150 and the pressure relief hole 141 each are in a shape corresponding to that of the explosion-proof valve 124. In this embodiment, the explosion-proof valve 124 has the shape similar to an ellipse, while the hollowed-out end 152 of the protrusion 150 has a circumference in a shape of a ring track. The plurality of ribs 155 at the hollowed-out end 152 include two ribs 155 vertically intersecting each other and a rib 155 in a shape of a ring track. The two ribs 155 vertically intersecting each other are located at a central position. The rib 155 in the shape of the ring track are connected to the two ribs 155 vertically intersecting each other. Other ribs 155 are connected between the rib 155 in the shape of the ring track and the circumference of the hollowed-out end 152. The ribs 155 arranged in the above manner can better support various parts of the thinned region 132, and facilitate the discharge of the high-temperature and high-pressure gas or liquid from the hollowed-out end 152. It should be understood that, in other embodiments, the explosion-proof valve 124 may be in a circular shape, a square shape, or other shapes. The shape of each of the protrusion 150 and pressure relief hole 141 is adjusted accordingly with that of the explosion-proof valve 124.

As illustrated in FIG. 4, the separator 140 is further provided with two raised bars 142 and spacer bars 143. Each of the plurality of protrusions 150 is arranged between the two raised bars 142 arranged opposite to each other. Each of the two raised bars 142 forms a side groove wall of a wiring groove 144 at the separator 140. Each spacer bar 143 is connected between the two raised bars 142 arranged opposite to each other. Each space bar 143 is arranged between two adjacent protrusions 150 to space the two adjacent protrusions 150 apart. The heat insulation plate is supported by the two raised bars 142 and all the spacer bars 143 at a side surface of the heat insulation plate 130. That is, from a perspective of height, a part of each of the plurality of protrusions 150 not inserting into the recess 134 has a height equal to a height of each of the two raised bars 142. The height of each of the two raised bars 142 is equal to a height of each of the spacer bars 143. That is, the height of each of the two raised bars 142 or each of the spacer bars 143 is equal to a distance between opposite surfaces of the separator 140 and the heat insulation plate 130. It should be noted that the heights of the protrusion 150, the raised bar 142, and the spacer bar 143 are determined with a surface of the separator 140 facing the heat insulation plate 130 as a benchmark.

On a basis that the thinned region 132 is supported by the hollowed-out end 152 of the protrusion 150, by setting the part of each of the plurality of protrusions 150 not inserting into the recess 134 to have the height equal to the height of each of the two raised bars 142 and equal to the height of each of the spacer bars 143, the two raised bars 142 and all the spacer bars 143 are supported at a plate surface of the heat insulation plate 130 facing towards the separator 140. That is, no gap exists between each of the raised bar 142 and a top of the spacer bar 143 and the heat insulation plate 130. In this way, a plurality of mutually spaced independent spaces are formed between the heat insulation plate 130, the two raised bars 142, and all the spacer bars 143. Each protrusion 150 is located in one independent space. Therefore, even if the high-temperature and high-pressure gas or liquid diffuses into the independent space through the pressure relief channel, the high-temperature and high-pressure gas is kept from spreading onto wires in the wiring groove 144. In addition, the independent space can further limit diffusion of the high-temperature and high-pressure gas or liquid.

To facilitate wiring, the raised bars 142 may be discontinuous rather than continuous. In addition, the spacer bar 143 is arranged at a gap between two raised bars 142 arranged opposite to each other, to form a communication groove (not labeled). The communication groove is in communication with wiring grooves 144 at two sides. Wires at the wiring groove 144 at one of the two sides can be routed to the wiring groove 144 at the other one of the two sides through the communication groove, in such a manner that the wires can be arranged more conveniently.

In this embodiment, the heat insulation plate 130 is a mica plate and formed through integrated injection molding. The heat insulation plate 130 may be made of, but is not limited to being made of, engineering plastics. Fire resistance of the heat insulation plate 130 can be improved through adding a flame retardant.

Figure 10:
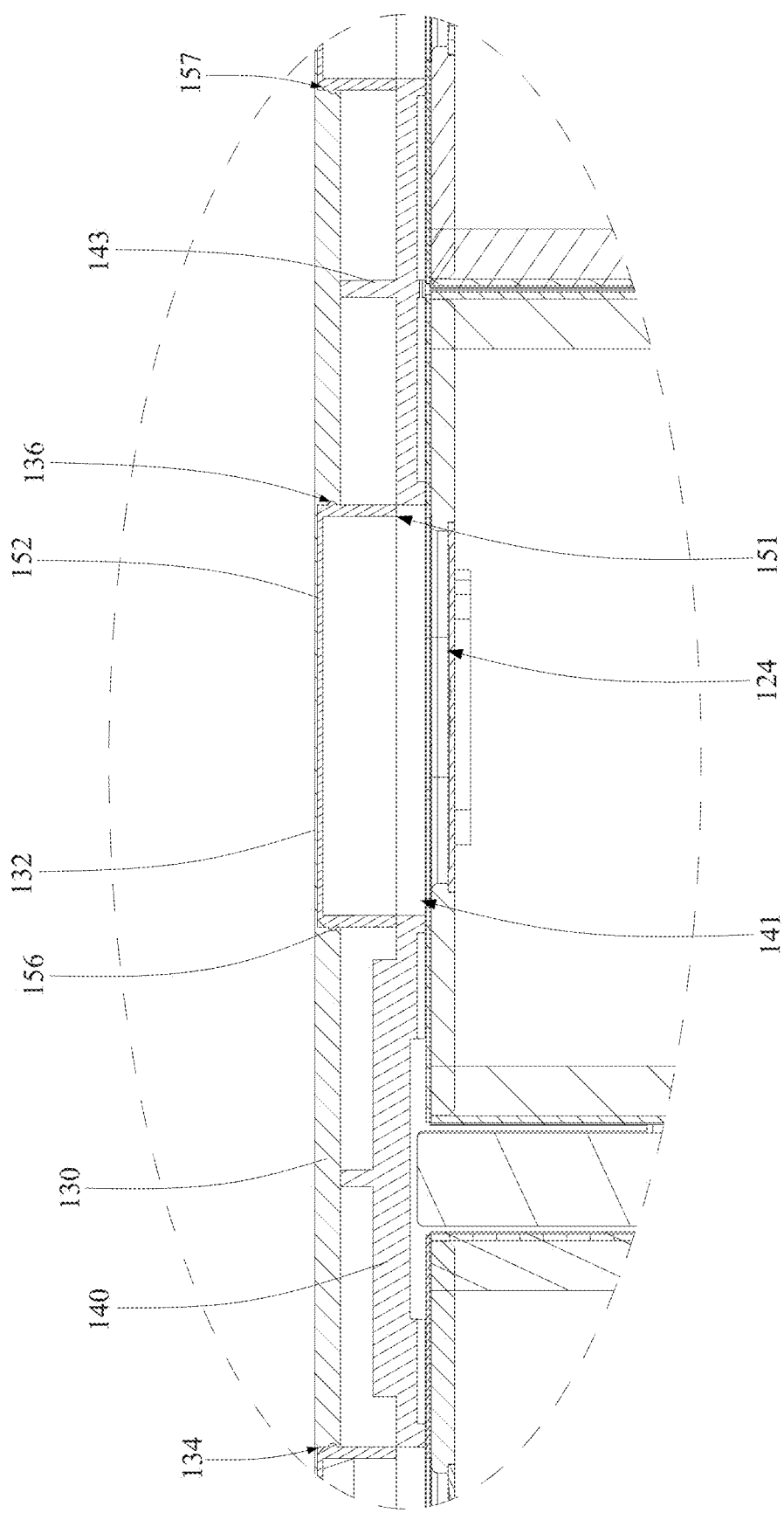
FIG. 10 is a sectional partial view of a battery module and a heat insulation plate of an energy storage device according to another embodiment of the present disclosure.

FIG. 10 illustrates a sectional partial view of a battery module and a heat insulation plate of an energy storage device according to another embodiment of the present disclosure. As illustrated in FIG. 10 and in conjunction with FIG. 4, compared with the protrusion 150 of the separator 140 of the energy storage device 100 according to the above-mentioned embodiment having the first portion 153 and the second portion 154 that are different from each other, the protrusion 150 of the separator 140 of the energy storage device 100 according to this embodiment forms the pressure relief channel having an unchanged size. Each of the plurality of protrusions 150 has an outer side surface adapted to or tightly fitted to a side wall of the recess 134. Therefore, no gap exists between the outer side surface of the protrusion 150 and the side wall of the recess 134, which can prevent the high-temperature and high-pressure gas from spreading around through the gap between the outer side surface of the protrusion 150 and the side wall of the recess 134. Further, with the raised bars 142 and the spacer bars 143 of the separator 140, the independent spaces formed between the heat insulation plate 130, the raised bars 142 and the spacer bars 143 can further prevent the diffusion of the high-temperature and high-pressure gas. Therefore, two anti-diffusion structures are formed.

Further, the outer side surface of each of the plurality of protrusions 150 is provided with a first position-limiting portion 156. The side wall of the recess 134 is provided with a second position-limiting portion 136. The first position-limiting portion 156 and the second position-limiting portion 136 are in a male-female fit with each other. When the first position-limiting portion 156 and the second position-limiting portion 136 are in the male-female fit with each other, the hollowed-out end 152 is just supported at the thinned region 132, in such a manner that the hollowed-out end 152 is inserted into the recess 134 by a limited depth to prevent the hollowed-out end 152 from piercing the thinned region 132. Also, with the first position-limiting portion 156 and the second position-limiting portion 136, connection stability between the protrusion 150 and the recess 134 can be enhanced.

In this embodiment, the first position-limiting portion 156 is a raised ring, and the second position-limiting portion 136 is a ring groove. The raised ring is engaged in the ring groove to improve sealing performance at lateral parts where the protrusion 150 is engaged with the recess 134, better preventing the high-temperature and high-pressure gas or liquid from overflowing the lateral parts where the protrusion 150 is engaged with the recess 134. It should be noted that, in other embodiments, the first position-limiting portion 156 may be an elongated protuberance or a blocky protuberance, while the second position-limiting portion 136 may be an engagement groove adapted to the first position-limiting portion 156. Alternatively, the first position-limiting portion 156 may be the ring groove or an engagement groove of other shapes, while the second position-limiting portion 136 may be the raised ring, the elongated protuberance, or the blocky protuberance.

In this embodiment, an outer edge of the hollowed-out end 152 has a chamfer 157, which facilitates mounting and positioning of the heat insulation plate 130. It should be understood that, in other embodiments, a filleted corner may be used instead of the chamfer 157 with the same mounting and positioning effect. Alternatively, a chamfer or a filleted corner is arranged at an inner edge of the recess 134 in lieu of the chamfer 157 or the filleted corner at the hollowed-out end 152. The chamfer 157 has an angle ranging from 75° to 85°.

Other aspects of the energy storage device 100 according to this embodiment are substantially the same as other aspects of the energy storage device 100 according to the above-mentioned embodiments, and thus reference to details thereof can be made to the description of the above-mentioned embodiments, which are not described in detail herein.

Figure 11:
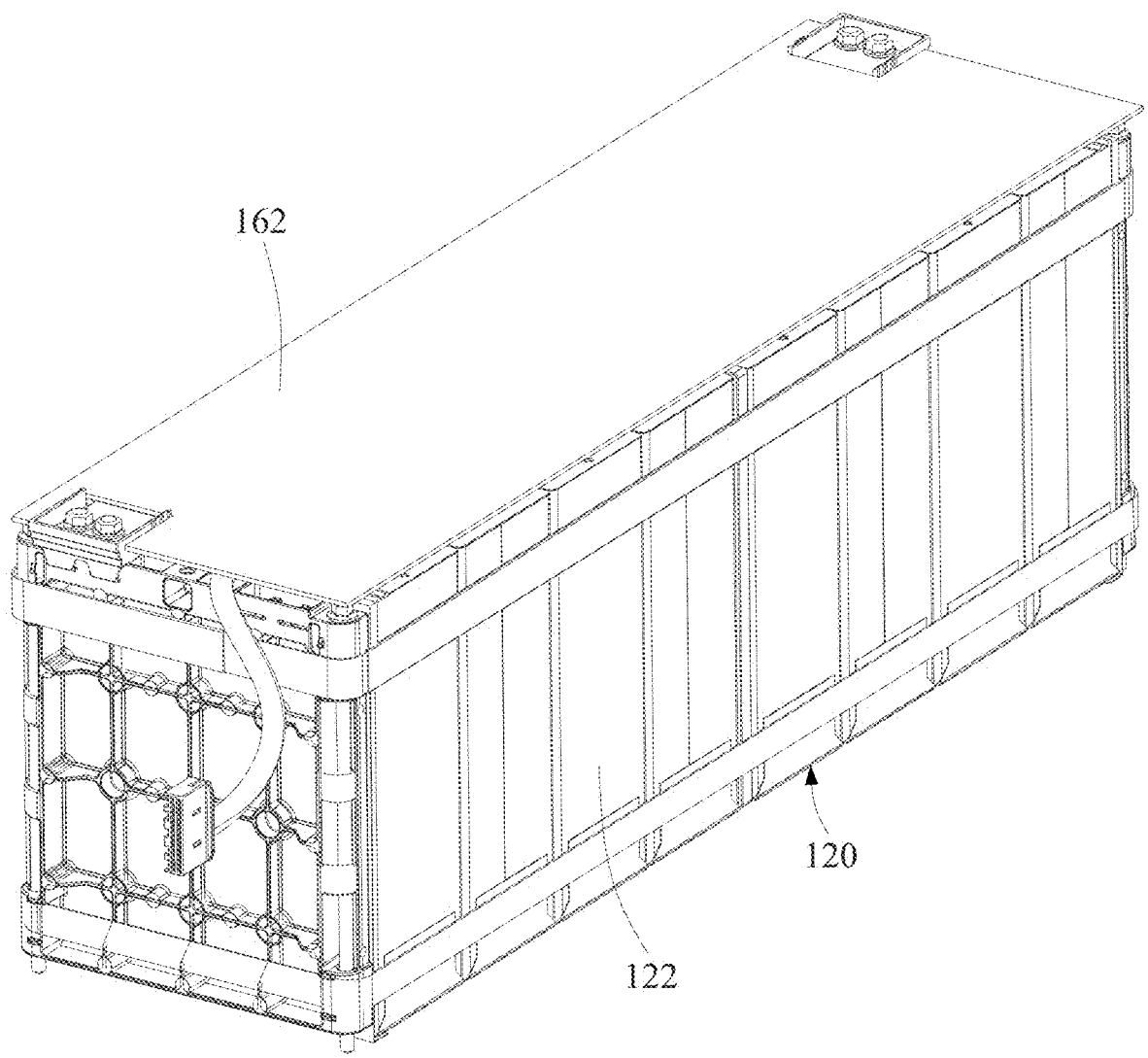
FIG. 11 is a schematic view of a structure of a battery module and a heat insulation plate of an energy storage device according to yet another embodiment of the present disclosure.
Figure 12:
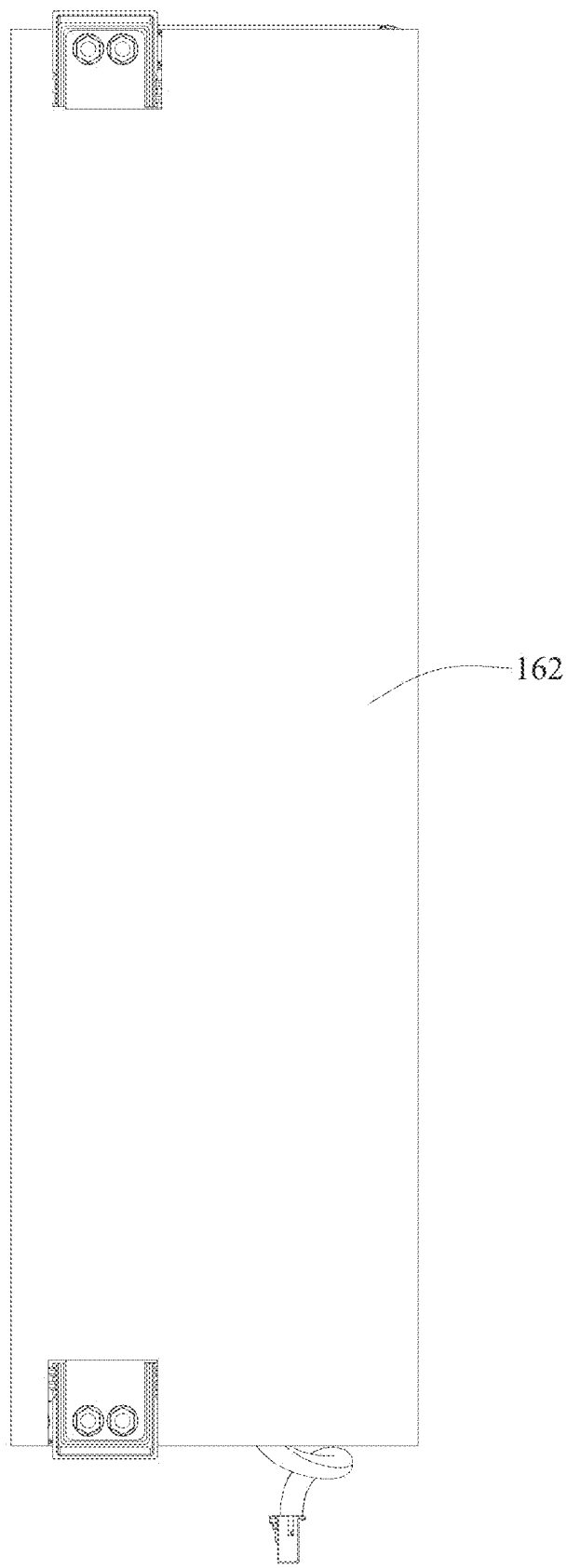
FIG. 12 is a top view of the structure illustrated in FIG. 11.

FIG. 11 illustrates a schematic view of a structure of a battery module and a heat insulation plate of an energy storage device according to yet another embodiment of the present disclosure. FIG. 12 illustrates a top view of the structure illustrated in FIG. 11. As illustrated in FIG. 11 and FIG. 12, compared with the heat insulation plate 130 of the energy storage device 100 according to the above-mentioned embodiment in which the heat insulation plate 130 is arranged on at least two battery modules 120, a heat insulation plate 162 of the energy storage device 100 according to this embodiment is only arranged at a single battery module 120. That is, each battery module 120 is provided with one heat insulation plate 162. A specific arrangement of the heat insulation plate 162 is substantially the same as that of the heat insulation plate 130 according to the above-mentioned embodiment, with the only difference in size. During the assembly, the heat insulation plate 162 is first assembled at each battery module 120, and then each battery module 120 and the heat insulation plate 162 at the battery module 120 are arranged in the box body 110, without mounting the heat insulation plate 130 in the box body 110, which simplifies the assembly of the energy storage device 100 and improves an assembly efficiency.

Other aspects of the energy storage device 100 according to this embodiment are substantially the same as other aspects of the energy storage device 100 according to the above-mentioned embodiments, and thus reference to details thereof can be made to the description of the above-mentioned embodiments, which are not described in detail herein.

Figure 13:
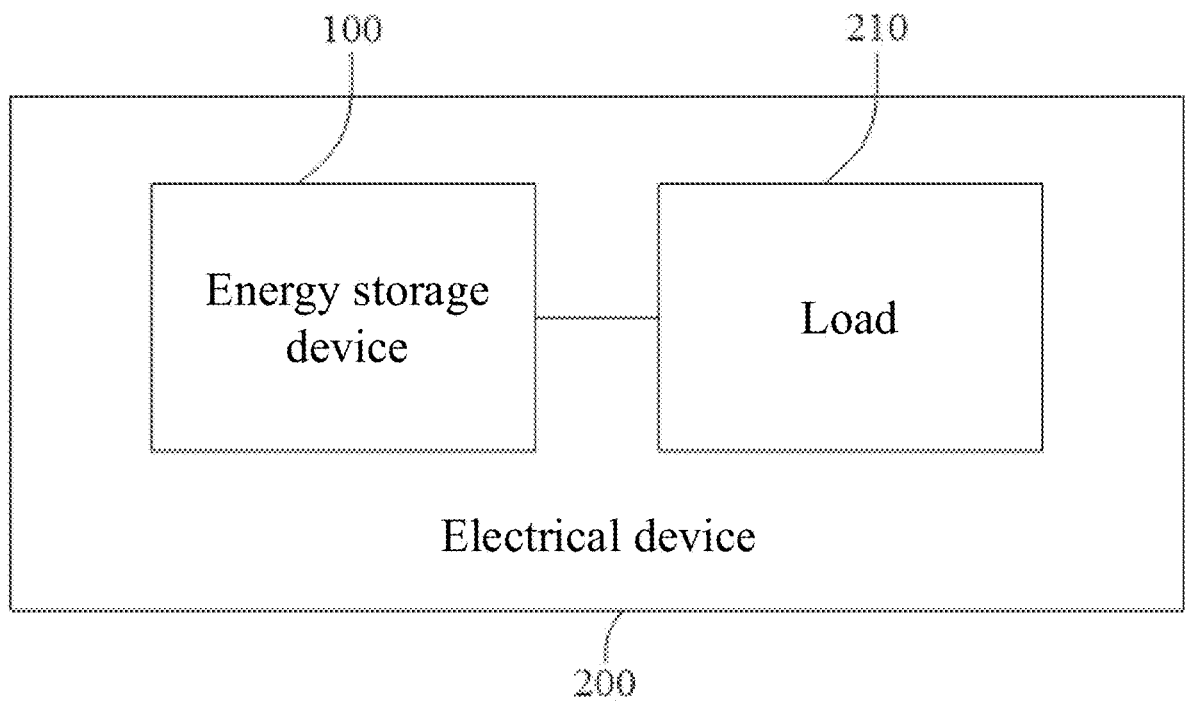
FIG. 13 is a block diagram showing modules in an electrical device according to an embodiment of the present disclosure.

FIG. 13 illustrates a block diagram showing modules in an electrical device according to an embodiment of the present disclosure. As illustrated in FIG. 13, an electrical device 200 according to an embodiment of the present disclosure includes the energy storage device 100 and a load 210. The load 210 is electrically connected to the energy storage device 100. The energy storage device 100 is configured to supply electrical energy to the load 210. Reference to a specific structure of the energy storage device 100 can be made to the above-mentioned embodiments. Since the electrical device 200 according to this embodiment adopts all the technical solutions of all the above-mentioned embodiments, the electrical device 200 also has all the advantageous effects brought about by the technical solutions of the above-mentioned embodiments, and thus details thereof will be omitted here.

Technical features in the above embodiments can be combined arbitrarily. For concise description, not all possible combinations of the technical features in the above embodiments are described. However, any combination of the technical features in the above embodiments should be considered as falling within the scope of the present disclosure, as long as no conflict occurs between combinations of the technical features.

The above embodiments illustrate merely some embodiments of the present disclosure, which are described in details but should not be construed to limit the scope of the present disclosure. It should be understood that those skilled in the art can make various modifications and improvements without departing from the concept of the present disclosure, and these modifications and improvements shall fall within the protection scope of the present disclosure. The protection scope of the present disclosure shall be defined by the appended claims.

What is claimed is:

1. An energy storage device, comprising:
   a box body;
   a battery module arranged in the box body, the battery module comprising a plurality of battery cells and a separator arranged on the plurality of battery cells, the separator having a plurality of pressure relief holes, the plurality of pressure relief holes being arranged corresponding to explosion-proof valves of the plurality of battery cells, respectively; and
   a heat insulation plate arranged between a top of the box body and the battery module, wherein:
   the heat insulation plate has a plurality of thinned regions;
   the separator comprises a plurality of protrusions protruding towards the heat insulation plate;
   the plurality of protrusions are arranged between the plurality of pressure relief holes and the plurality of thinned regions, respectively; and
   each of the plurality of protrusions is hollowed to form a communication end and a hollowed-out end, the communication end being in communication with a corresponding one of the plurality of pressure relief holes, and the hollowed-out end being configured to support a corresponding one of the plurality of thinned regions and constructed to be hollowed,
   wherein each of the plurality of thinned regions is formed by defining a recess, the recess being recessed in a direction away from the separator, and the hollowed-out end extending into the recess.

2. The energy storage device according to claim 1, wherein an outer edge of the hollowed-out end has a chamfer or a filleted corner.

3. The energy storage device according to claim 1, wherein each of the plurality of protrusions comprises a first portion and a second portion in communication with the first portion, the communication end being an end of the first portion away from the second portion, the hollowed-out end being an end of the second portion away from the first portion, and the hollowed-out end tapering towards a center with respect to another end of the second portion.

4. The energy storage device according to claim 1, wherein each of the plurality of protrusions has an outer side surface adapted to or tightly fitted to a side wall of the recess.

5. The energy storage device according to claim 4, wherein:
   the outer side surface of each of the plurality of protrusions is provided with a first position-limiting portion; and
   the side wall of the recess is provided with a second position-limiting portion, the first position-limiting portion and the second position-limiting portion being in a male-female fit with each other.

6. The energy storage device according to claim 1, wherein the hollowed-out end is provided with a plurality of ribs intersecting each other, each of the plurality of ribs having a thickness ranging from 0.3 mm to 0.6 mm.

7. The energy storage device according to claim 2, wherein the hollowed-out end is provided with a plurality of ribs intersecting each other, each of the plurality of ribs having a thickness ranging from 0.3 mm to 0.6 mm.

8. The energy storage device according to claim 1, wherein a sum of a height of each of the plurality of protrusions and a depth of each of the plurality of pressure relief holes is greater than half of a maximum length of each of the explosion-proof valves.

9. The energy storage device according to claim 2, wherein a sum of a height of each of the plurality of protrusions and a depth of each of the plurality of pressure relief holes is greater than half of a maximum length of each of the explosion-proof valves.

10. The energy storage device according to claim 1, wherein:
the separator is provided with two raised bars and spacer bars, each of the plurality of protrusions being arranged between the two raised bars arranged opposite to each other, each of the two raised bars forming a side groove wall of a wiring groove at the separator, each of the spacer bars being connected between the two raised bars arranged opposite to each other, and each of the spacer bars being arranged between two adjacent protrusions of the plurality of protrusions;
the heat insulation plate is supported by the two raised bars and all of the spacer bars at a side surface of the heat insulation plate; or
a part of each of the plurality of protrusions not inserting into the recess has a height from a surface of the separator facing the heat insulation plate equal to a height, from the surface of the separator facing the heat insulation plate, of each of the two raised bars, the height of each of the two raised bars being equal to a height, from the surface of the separator facing the heat insulation plate, of each of the spacer bars.

11. An electrical device, comprising:
a load; and
an energy storage device, the load and the energy storage device being electrically connected to each other,
wherein the energy storage device comprises:
a box body;
a battery module arranged in the box body, the battery module comprising a plurality of battery cells and a separator arranged on the plurality of battery cells, the separator having a plurality of pressure relief holes being arranged corresponding to explosion-proof valves of the plurality of battery cells, respectively; and
a heat insulation plate arranged between a top of the box body and the battery module, wherein:
the heat insulation plate has a plurality of thinned regions;
the separator comprises a plurality of protrusions protruding towards the heat insulation plate;
the plurality of protrusions are arranged between the plurality of pressure relief holes and the plurality of thinned regions, respectively; and
each of the plurality of protrusions is hollowed to form a communication end and a hollowed-out end, the communication end being in communication with a corresponding one of the plurality of pressure relief holes, and the hollowed-out end being configured to support a corresponding one of the plurality of thinned regions and constructed to be hollowed,
wherein each of the plurality of thinned regions is formed by defining a recess, the recess being recessed in a direction away from the separator, and the hollowed-out end inserting into the recess.

12. The electrical device according to claim 11, wherein an outer edge of the hollowed-out end has a chamfer or a filleted corner.

13. The electrical device according to claim 11, wherein each of the plurality of protrusions comprises a first portion and a second portion in communication with the first portion, the communication end being an end of the first portion away from the second portion, the hollowed-out end being an end of the second portion away from the first portion, and the hollowed-out end tapering towards a center with respect to another end of the second portion.

14. The electrical device according to claim 11, wherein each of the plurality of protrusions has an outer side surface adapted to or tightly fitted to a side wall of the recess.

15. The electrical device according to claim 14, wherein:
the outer side surface of each of the plurality of protrusions is provided with a first position-limiting portion; and
the side wall of the recess is provided with a second position-limiting portion, the first position-limiting portion and the second position-limiting portion being in a male-female fit with each other.

16. The electrical device according to claim 11, wherein the hollowed-out end is provided with a plurality of ribs intersecting each other, each of the plurality of ribs having a thickness ranging from 0.3 mm to 0.6 mm.

17. The electrical device according to claim 11, wherein a sum of a height of each of the plurality of protrusions and a depth of each of the plurality of pressure relief holes is greater than half of a maximum length of each of the explosion-proof valves.

18. The electrical device according to claim 11, wherein:
the separator is provided with two raised bars and spacer bars, each of the plurality of protrusions being arranged between the two raised bars arranged opposite to each other, each of the two raised bars forming a side groove wall of a wiring groove at the separator, each of the spacer bars being connected between the two raised bars arranged opposite to each other, and each of the spacer bars being arranged between two adjacent protrusions of the plurality of protrusions;
the two raised bars and all of the spacer bars are supported at a side surface of the heat insulation plate; or
a part of each of the plurality of protrusions not inserting into the recess has a height from a surface of the separator facing the heat insulation plate equal to a height, from the surface of the separator facing the heat insulation plate, of each of the two raised bars, the height of each of the two raised bars being equal to a height, from the surface of the separator facing the heat insulation plate, of each of the spacer bars.

\* \* \* \* \*